US012738051B2

(12) United States Patent
Pschierer

(10) Patent No.: US 12,738,051 B2
(45) Date of Patent: Sep. 15, 2026

(54) AUTOMATIC SEGMENTATION OF GEOSPATIAL AIRPORT DATA

(71) Applicant: Jeppesen ForeFlight, Inc., Englewood, CO (US)

(72) Inventor: Christian Karl Pschierer, Ochsenfurt (DE)

(73) Assignee: Jeppesen ForeFlight, Inc., Englewood, CO (US)

( * ) Notice: Subject to any disclaimer, the term of this patent is extended or adjusted under 35 U.S.C. 154(b) by 227 days.

(21) Appl. No.: 18/464,403

(22) Filed: Sep. 11, 2023

(65) Prior Publication Data

US 2025/0086965 A1 Mar. 13, 2025

(51) Int. Cl.
*G06V 20/10* (2022.01)
*G08G 5/51* (2025.01)

(52) U.S. Cl.
CPC ............. *G06V 20/176* (2022.01); *G08G 5/51* (2025.01)

(58) Field of Classification Search
None
See application file for complete search history.

(56) References Cited

U.S. PATENT DOCUMENTS 6,622,085 B1 * 9/2003 Amita ..................... G06T 17/05 340/995.14
9,495,879 B2 * 11/2016 Depape .................. G01C 21/28
2012/0136562 A1 * 5/2012 Mere ........................ G08G 5/51 701/120
2013/0179060 A1 * 7/2013 Marczi ..................... G08G 5/51 701/120
2015/0276409 A1 * 10/2015 Dhulipudi ................ G08G 5/51 701/3
2020/0020104 A1 * 1/2020 Mittal .................. G06V 20/588
(Continued)

FOREIGN PATENT DOCUMENTS

CN 103733234 A * 4/2014 ............. H04N 7/181
EP 1887542 A2 2/2008
(Continued)

OTHER PUBLICATIONS

Nelson, D. (Ed.). (2008). Polygon. The Penguin Dictionary of Mathematics (4th ed.). Penguin. https://search.credoreference.com/articles/Qm9va0FydGljbGU6MTIwNTYyOQ==?aid=279753 (Year: 2008).*

(Continued)

*Primary Examiner* — Amandeep Saini
*Assistant Examiner* — Caroline Tabancay Duffy
(74) *Attorney, Agent, or Firm* — Lathrop GPM LLP

(57) ABSTRACT

A method includes obtaining medial axes of buffers around guidance lines of taxiways of an airport. The buffers define a taxiway polygon representation of the taxiways. The method includes identifying a plurality of intersection points of the medial axes. The method includes segmenting the taxiway polygon into taxiway segments with segment lines based on the plurality of intersection points, where a particular segment line associated with an intersection point is offset a distance from the intersection point and is at a particular angle relative to a medial axis extending from the intersection point. The method further includes generating a map of the airport that includes the taxiway segments.

21 Claims, 5 Drawing Sheets

(56) References Cited

U.S. PATENT DOCUMENTS

2023/0062680 A1* 3/2023 Sahu ........................ G08G 5/51

FOREIGN PATENT DOCUMENTS

| | | | |
|---|---|---|---|
| EP | 2927894 | A3 | 10/2015 |
| JP | H09269997 | A * | 10/1997 |

OTHER PUBLICATIONS

Extended European Search Report for application No. 24192270.7 dated Jan. 29, 2025, pp. 1-9.

Thales Group, "Thales and LuxCarta Signs a Partnership to Offer Artificial Intelligence Powered Solutions for Military Intelligence and Cartography," https://www.thalesgroup.com/en/worldwide/defence/press_release/thales-and-luxcarta-sign-partnership-offer-artificial-intelligence for basic feature extraction, downloaded Sep. 1, 2023, pp. 1-4.

* cited by examiner

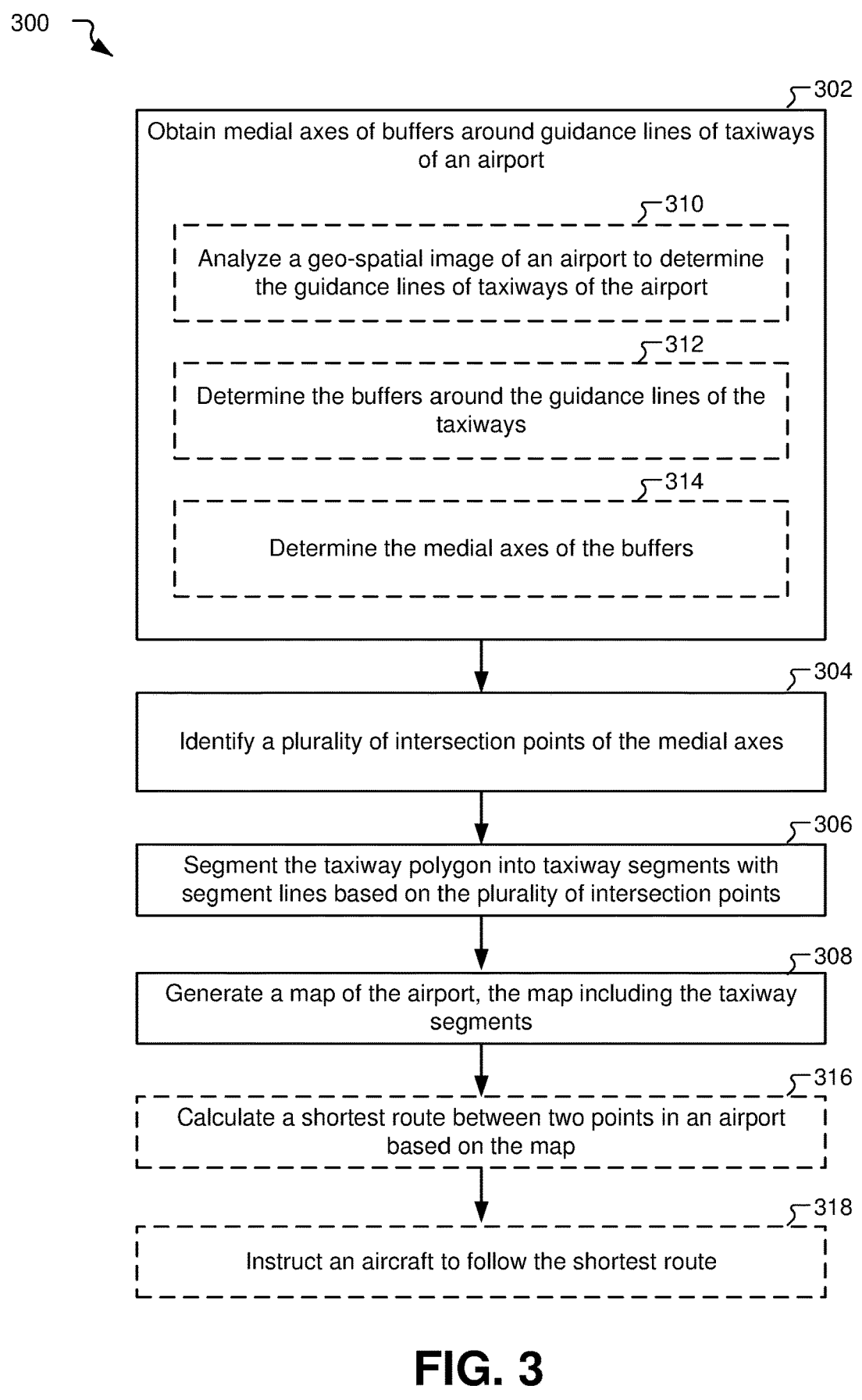

300

302 Obtain medial axes of buffers around guidance lines of taxiways of an airport 310 Analyze a geo-spatial image of an airport to determine the guidance lines of taxiways of the airport 312 Determine the buffers around the guidance lines of the taxiways 314 Determine the medial axes of the buffers 304 Identify a plurality of intersection points of the medial axes 306 Segment the taxiway polygon into taxiway segments with segment lines based on the plurality of intersection points 308 Generate a map of the airport, the map including the taxiway segments 316 Calculate a shortest route between two points in an airport based on the map 318 Instruct an aircraft to follow the shortest route

FIG. 3

AUTOMATIC SEGMENTATION OF GEOSPATIAL AIRPORT DATA

FIELD OF THE DISCLOSURE

The present disclosure is generally related to systems and methods for automatically segmenting geospatial airport data.

BACKGROUND

Aerodrome mapping databases provide geographic information about airports that can assist in land based navigation of aircraft at the airports. The entries for the database can be generated based on geo-rectified satellite images or engineering drawings to produce polygon representations of airports that depicts taxiways and other features of the airports. Due to segmentation of polygons being domain specific, a generated polygon for an airport is manually segmented to identify and name particular taxiways at the airport. Manually segmenting polygon representations of an airports can be time consuming, expensive, and can result in inconsistencies in designation of taxiways for airports that include the same types of features.

SUMMARY

In a particular implementation, a method includes obtaining medial axes of buffers around guidance lines of taxiways of an airport. The buffers define a taxiway polygon representation of the taxiways. The method includes identifying a plurality of intersection points of the medial axes. The method includes segmenting the taxiway polygon into taxiway segments with segment lines based on the plurality of intersection points, where a particular segment line associated with an intersection point is offset a distance from the intersection point and is at a particular angle relative to a medial axis extending from the intersection point. The method further includes generating a map of the airport that includes the taxiway segments.

In another particular implementation, a device includes a memory configured to store a digital representation of guidance lines of taxiways of an airport. The device further includes a processor configured to obtain medial axes of buffers around guidance lines of taxiways of an airport. The buffers define a taxiway polygon representation of the taxiways. The processor is configured to identify a plurality of intersection points of the medial axes. The processor is configured to segment the taxiway polygon into taxiway segments with segment lines based on the plurality of intersection points. A particular segment line associated with an intersection point is offset a distance from the intersection point and is at a particular angle relative to a medial axis extending from the intersection point. The processor is further configured to generate a map of the airport. The map includes the taxiway segments.

In another particular implementation, a computer-readable storage device stores instructions that are executable by one or more processors to obtain medial axes of buffers around guidance lines of taxiways of an airport. The buffers define a taxiway polygon representation of the taxiways. The instructions are executable by the one or more processors to identify a plurality of intersection points of the medial axes. The instructions are executable by the one or more processors to segment the taxiway polygon into taxiway segments with segment lines based on the plurality of intersection points. A particular segment line associated with an intersection point is offset a distance from the intersection point and is at a particular angle relative to a medial axis extending from the intersection point. The instructions are further executable by the one or more processors to generate a map of the airport. The map includes the taxiway segments.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 3 is a flow chart of an example of a method of automated segmentation of geospatial airport data.

DETAILED DESCRIPTION

Aerodrome mapping databases provide geographic information about airports that can assist in land based navigation of aircraft at the airports. The entries for the database can be generated based on geo-rectified satellite images or based on engineering drawings. An automated system converts data from a geo-rectified satellite image, an engineering drawing, or a processed polygon to generate a segmented polygon that is compliant with relevant industry standards. Technical benefits of systems for providing entries for aerodrome mapping databases based on segmentation of polygons for airport taxiways include removal of subjective choices performed by humans segmenting the polygons, increased consistency for segmentation for similar features at different airports, time reduction for generation of the entries, reduced cost associated with generation of the entries, and ease of modifying entries in the aerodrome mapping databases based on changes to taxiways at one or more airports.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1A:
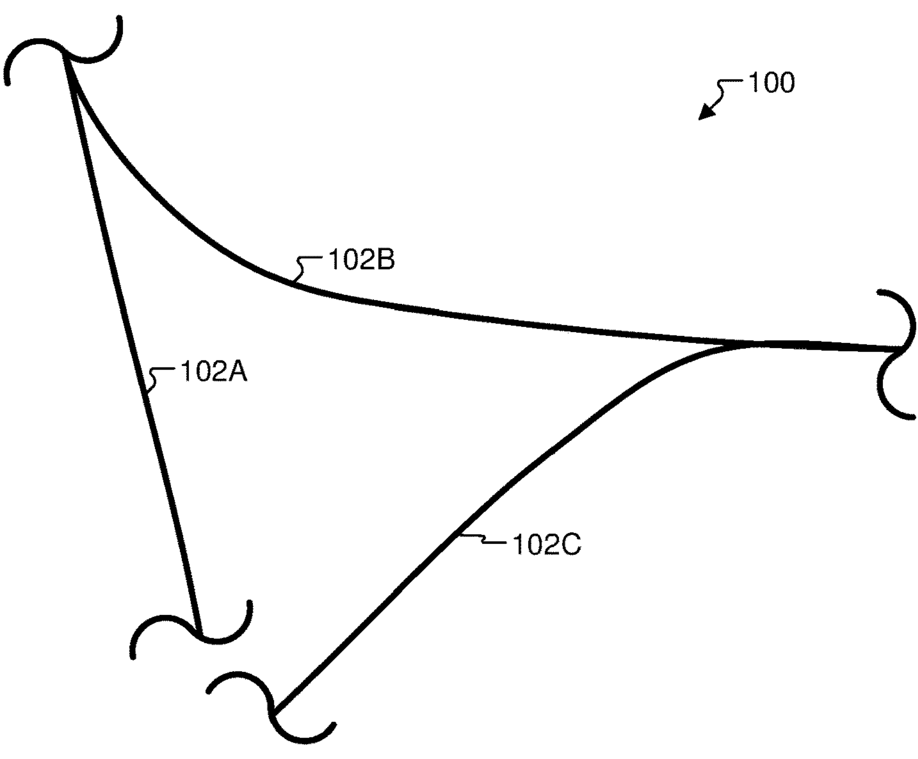
FIG. 1A is a diagram that illustrates a step of automated segmentation of geospatial airport data.

Referring to FIG. 1A, a map 100 of a portion of an airport is shown. The map includes guidance lines 102 of the airport. In some implementations, the guidance lines 102 include center lines of taxiways of the airport. The guidance lines 102 may be extracted from geo-rectified satellite images, engineering drawings, or another file that provides a digital representation of the location of the guidance lines 102. While FIG. 1A only shows the guidance lines 102, the guidance lines 102 that are extracted may overlay additional data such as the geo-rectified satellite images or the engineering drawings in either file storage or in a visual representation of the map 100.

Figure 1B:
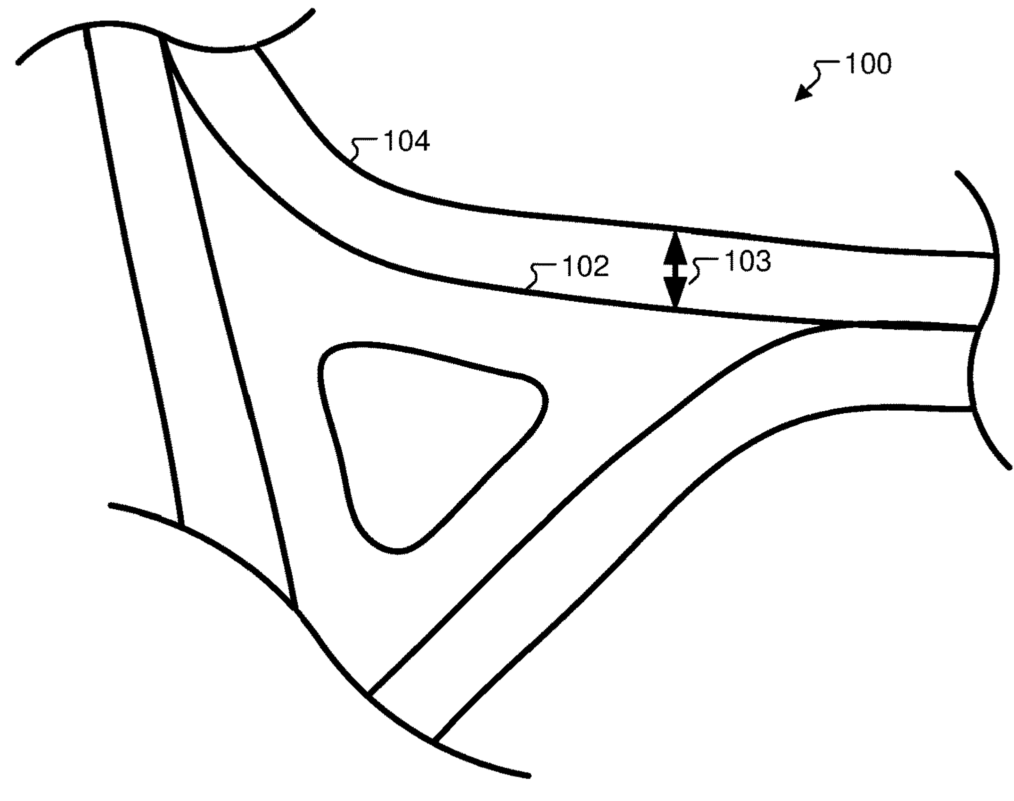
FIG. 1B is a diagram that illustrates a step of automated segmentation of geospatial airport data.

Referring to FIG. 1B, the map 100 is shown after buffers 104 have been determined around the guidance lines 102. The buffers 104 may form taxiway polygons. Guidance lines 102 may start near one or more terminals at an airport and may end at entrances to runways. Edges of the buffers 104 may correspond to physical objects at the airport (e.g., edges of taxiways or portions of an apron associated with an airport terminal that extends into a taxiway), may be generated as an offset distance 103 on each side of guidance lines 102, or as combinations thereof. Edges of the buffers 104 form a polygon of taxiways of the airport. While FIG. 1B only shows the guidance lines 102 and the buffer 104, the guidance lines 102 and the buffer 104 may overlay additional data such as the geo-rectified satellite images or the engineering drawings in either file storage or in a visual representation of the map 100.

Figure 1C:
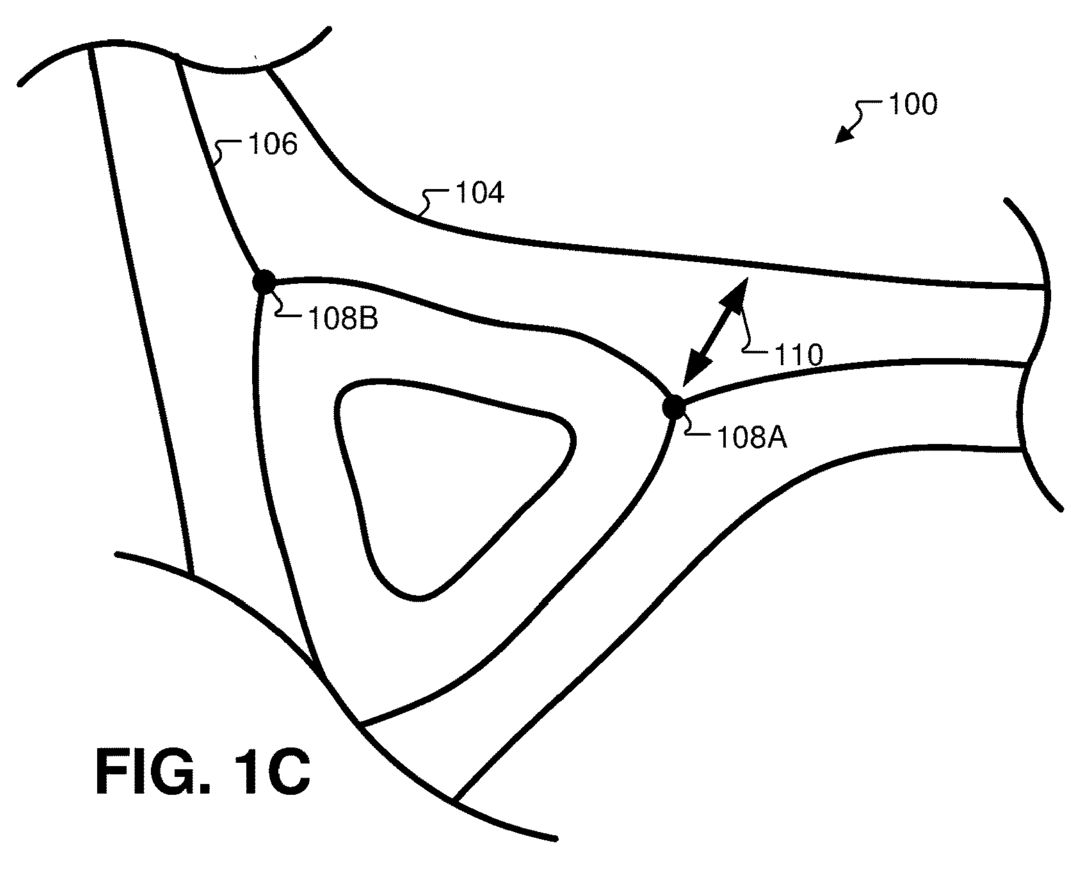
FIG. 1C is a diagram that illustrates a step of automated segmentation of geospatial airport data.

Referring to FIG. 1C, the map 100 is shown after medial axes 106 have been determined for the buffer 104. The medial axes 106 are determined based on a midpoint between the edges of the buffer 104. A medial axis 106 may be half the width 110 between two edges of the buffer 104 and may stop at a location of half the width before an edge of a buffer 104 in front of the media axis or on an edge of a buffer 104 when a corresponding guidance line 102 ends at the edge of the buffer 104. The medial axes 106 are distinct from the guidance lines 102. The medial axes 106 include multiple medial axes 106 that intersect at intersection points 108, including first intersection point 108A and second intersection point 108B. Intersection points 108 may be defined as a spot where at least two medial axes of the medial axes 106 intersect at a non zero angle. While FIG. 1C only shows the buffer 104, the medial axes 106, and the intersection points 108, the buffer 104, the medial axes 106, and the intersection points 108 may overlay additional data such as the geo-rectified satellite images or the engineering drawings in either file storage or in a visual representation of the map 100. The guidance lines 102 may also be included.

Figure 1D:
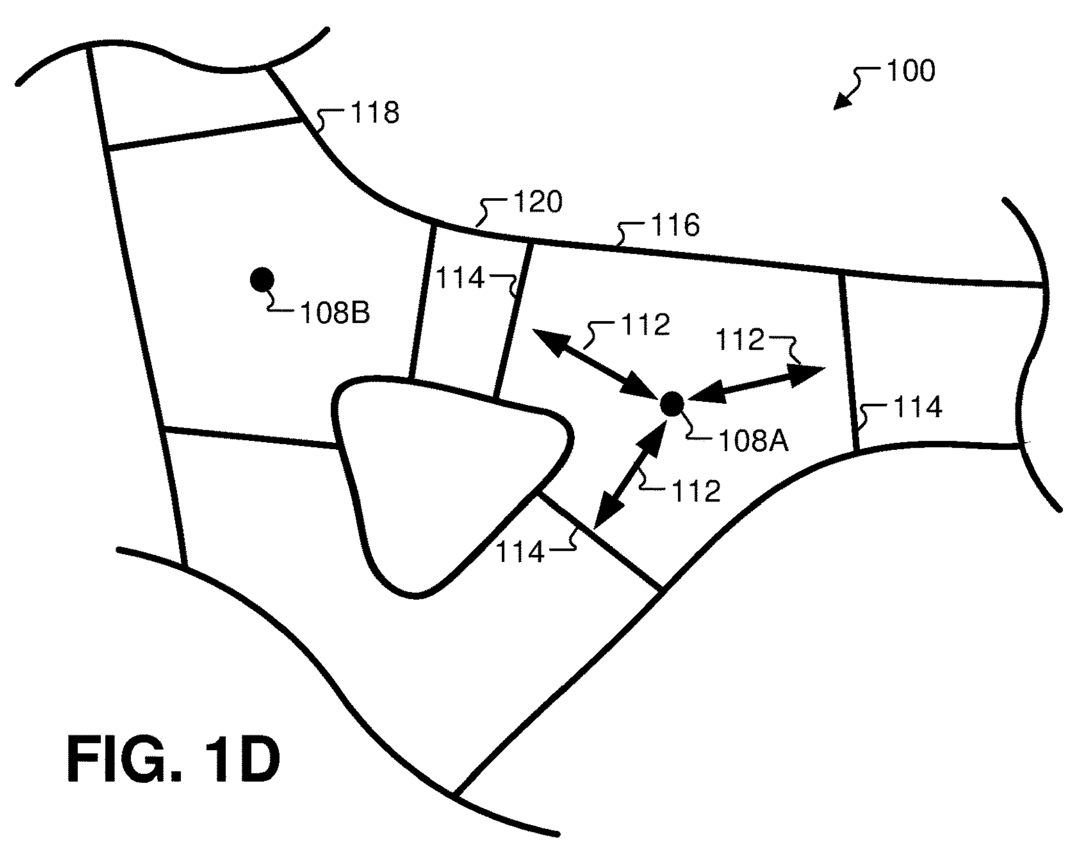
FIG. 1D is a diagram that illustrates a step of automated segmentation of geospatial airport data.

Referring to FIG. 1D, the map 100 is shown after segmenting the buffer 104. The buffer 104 is segmented into a first polygon 116 corresponding to the first intersection point 108A, a second polygon 118 corresponding to the second intersection point 108B, and a third polygon 120 based on segment lines 114. The segmentation is performed based on the intersection points 108A, 108B. Segment lines 114 are drawn an offset distance 112 away from the intersection points 108. The distance may be measured along the medial axes 106. The segment lines 114 may be drawn approximately 90 degrees relative to an intersection point with a medial axis of the medial axes 106. The buffer 104 is segmented into the first polygon 116, the second polygon 118, and the third polygon 120 based on the segment lines 114. While FIG. 1D only shows the first polygon 116, the second polygon 118, the third polygon 120, the medial axes 106, and the intersection points 108, the first polygon 116, the second polygon 118, and the third polygon 120, the medial axes 106, and the intersection points 108 may overlay additional data such as the geo-rectified satellite images or the engineering drawings in either file storage or in a visual representation of the map 100. In some implementations, the guidance lines 102 are shown and the medial axes 106 are not shown.

Figure 2A:
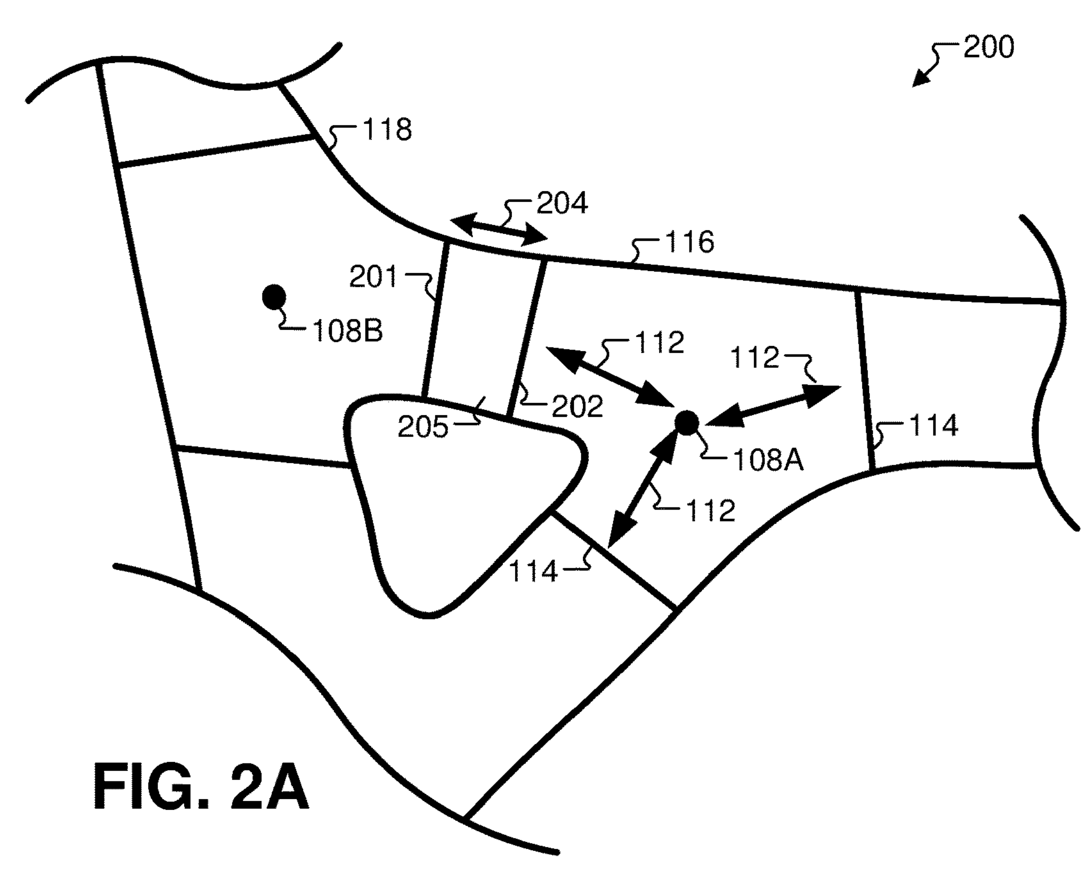
FIG. 2A is a diagram that illustrates a step of automated segmentation of geospatial airport data.

Referring to FIG. 2A, a map 200 of a portion of an airport is shown. The map has already had the segment lines 114 drawn the offset distance 112 away from the intersection points 108. The map 200 has a first potential segment line 201 and a second potential segment line 202 among the segment lines 114. The distance between the first potential segment line 201 and the second potential segment line 202 is compared to a threshold distance 204. If the distance between the first potential segment line 201 and the second potential segment line 202 along the medial axes 106 is greater than the threshold distance 204, then the segmentation results in fourth polygon 205.

Figure 2B:
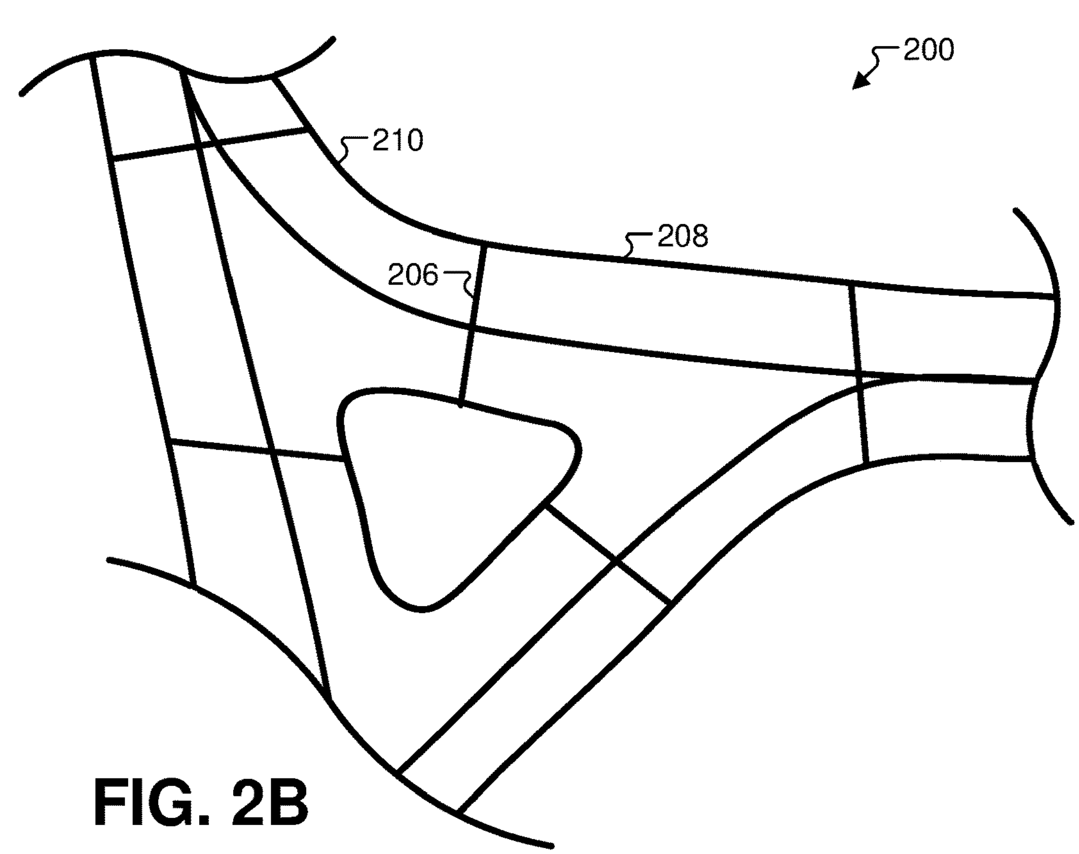
FIG. 2B is a diagram that illustrates a step of automated segmentation of geospatial airport data.

Referring to FIG. 2B, the map 200 is shown in a scenario where the first potential segment line 201 and the second potential segment line 202 fail to satisfy the threshold distance 204. As a result, a composite segment line 206 is identified based on the first potential segment line 201 and the second potential segment line 202. The composite segment line 206 may intersect a midpoint along the medial axes 106 between the first potential segment line 201 and the second potential segment line 202. The segmentation may result in a first composite polygon 208 and a second composite polygon 210 based on the composite segment line 206. Guidance lines 102 are shown on the map 200.

Referring to FIG. 3, a particular example of a method is depicted and generally designated 300. In a particular implementation, operations of the method 300 are initiated, performed, or controlled by a processor, such as by one or more processors 420 of FIG. 4 executing instructions.

The method 300 includes obtaining, at block 302 medial axes of buffers around guidance lines of taxiways of an airport. Obtaining the medial axes may result in the medial axes 106 as shown in FIGS. 1C and 1D.

Block 302 may include analyzing, at block 310, a geo-spatial image of an airport to determine the guidance lines of taxiways of the airport. The geo-spatial image may be obtained from a satellite, a database of satellite images, or any other source that can provide data of sufficient resolution. The guidance lines may correspond to guidance lines that are visible in the geo-spatial image, landmarks in the geo-spatial image, or any other identifiers in the geo-spatial image that provide information about the location of the guidance lines. Determining the guidance lines may result in the guidance lines 102 as shown in FIGS. 1A, 1B, and 2B.

Block 302 may further include determining, at block 312, the buffers around the guidance lines of the taxiways. The buffers may be generated by generating a taxiway polygon with edges a threshold distance away from the guidance lines, by using edges of taxiways determined from a satellite image, or both. Generating the buffer may also include applying a filter to the taxiway polygon to smooth any rough edges, uneven polygon edges, or any other unusual features in the polygon edges. Determining the buffer may result in the buffer 104 of FIG. 1B and FIG. 1C.

Block 302 may further include determining, at block 314, the medial axes of the buffers. The medial axes may be determined by identifying medial axes between two edges of the buffer. Determining the medial axes may result in the medial axes 106 of FIG. 1C and FIG. 1D.

The method 300 include identifying, at block 304, a plurality of intersection points of the medial axes. The intersection points may be identified based on a number of medial axes that intersect at a given location. An intersection point may be identified responsive to two or more medial axes intersecting. Identifying the intersection points results in intersection points 108 of FIGS. 1C, 1D, and 2A.

The method 300 includes segmenting, at block 306, the taxiway polygon into taxiway segments with segment lines based on the plurality of intersection points. The segment lines may be cross a medial axis of the medial axes a threshold distance away from the intersection points. If the segment lines are within a second threshold distance from each other, two of the segment lines may be combined to generate a combined segment line in between the locations of the two constitute segment lines. The segment lines may include segment lines 114 of FIG. 1D and FIG. 2A, first potential segment line 201 of FIG. 2A, and second potential segment line 202 of FIG. 2A. The composite segment lines may include composite segment line 206 of FIG. 2B. Segmenting the taxiway polygon into taxiway segments may result in first polygon 116 of FIG. 1D, second polygon 118 of FIG. 1D, third polygon 120 of FIG. 1D, fourth polygon 205 of FIG. 2A, first composite polygon 208 of FIG. 2B, and second composite polygon 210 of FIG. 2B.

The method 300 includes generating, at block 308, a map of the airport, the map including the taxiway segments. In addition to the taxiway segments, the map may further include the geo-spatial image of the airport, the guidance lines, the medial axes, the intersection points, the segment lines, or a combination thereof. Identifiers (e.g., names, letters, numbers, or combinations thereof) are assigned to the taxiway segments to facilitate subsequent identification of the taxiway segments.

The method 300 includes the optional step of calculating, at block 316, a shortest route between two points in an airport based on the map. The shortest distance may be determined based off of distances along the guidance lines. Alternatively, the shortest distance may be determined based off of a number of transitions between the taxiway segments. The shortest route may be identified based on instructions to transition from a first taxiway segment into a second taxiway segment with transitions between segments being identified as valid responsive to the first taxiway segment and the second taxiway segment having overlapping edges.

The method 300 includes the optional step of instructing, at block 318, an aircraft to follow the shortest route. The instructions may provide specific distance for the aircraft to travel or may identify specific taxiway segments that the aircraft is being instructed to travel through.

Figure 4:
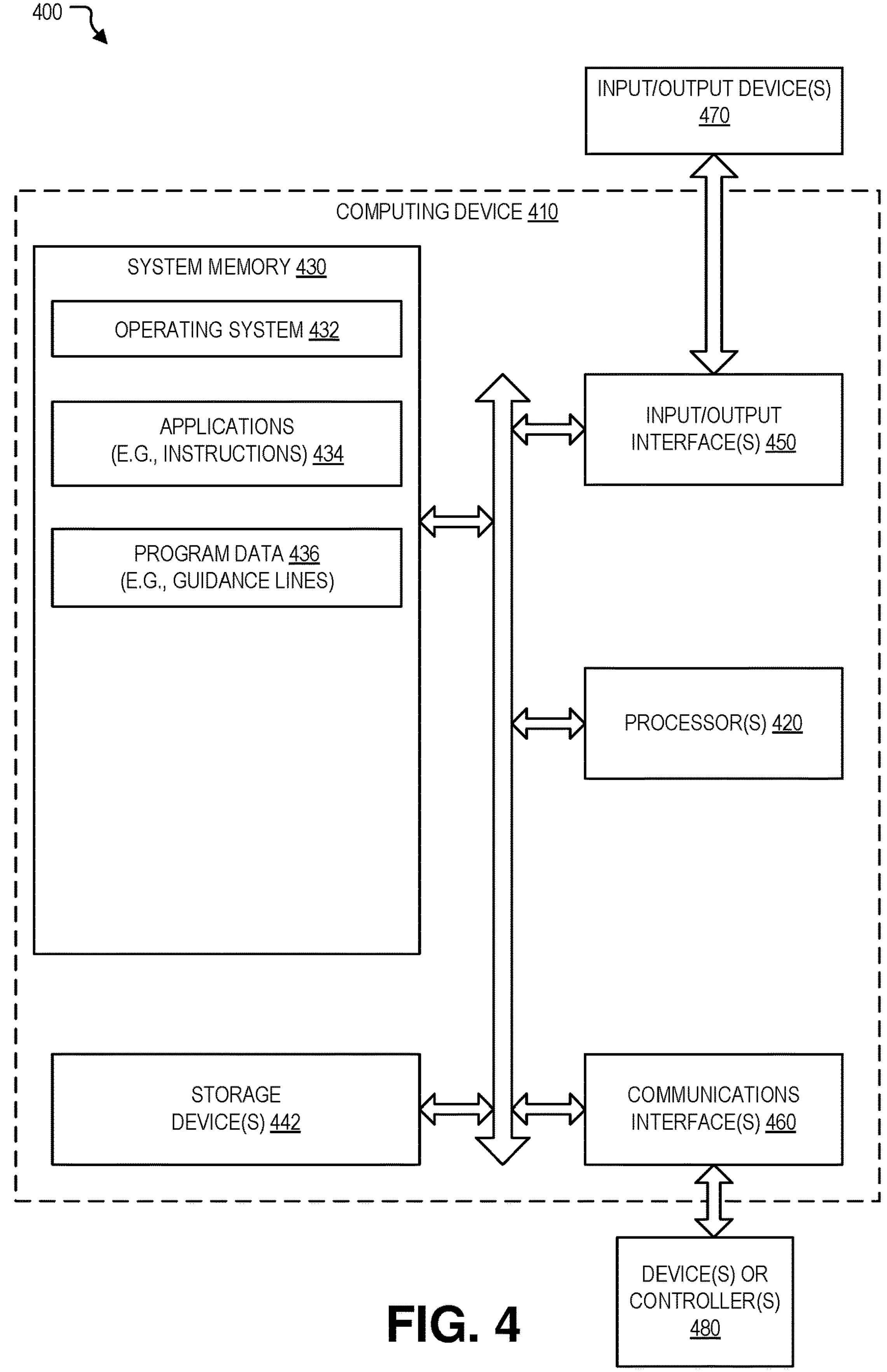
FIG. 4 is a block diagram of a computing environment configured to support aspects of automated segmentation of geospatial airport data methods and computer-executable program instructions (or code) according to the present disclosure.

FIG. 4 is an illustration of a block diagram of a computing environment 400 including a computing device 410. The computing device 410 is configured to support embodiments of computer-implemented methods and computer-executable program instructions (or code) according to the present disclosure. In some examples, the computing device 410, or portions thereof, executes instructions to initiate, perform, or control operations described herein (e.g., the method 300 of FIG. 3).

The computing device 410 includes one or more processors 420. The one or more processors 420 are configured to communicate with a system memory 430, one or more storage devices 442, one or more input/output interfaces 450, one or more communications interface(s) 460, or a combination thereof.

Depending on the particular implementation, the system memory 430 includes volatile memory devices (e.g., random access memory (RAM) devices), nonvolatile memory devices (e.g., read-only memory (ROM) devices, programmable read-only memory, or flash memory), one or more other memory devices, or a combination thereof. In FIG. 4, the system memory 430 stores an operating system 432, which can include a basic input/output system for booting the computing device 410 as well as a full operating system to enable the computing device 410 to interact with users, other programs, and other devices. The particular example of FIG. 4 also depicts that the system memory 430 stores one or more applications 434 executable by the one or more processors 420. In some examples, the one or more applications 434 include instructions executable by the one or more processors 420 to transmit signals between components of the computing device 410, such as the system memory 430, the one or more storage devices 442, the one or more input/output interfaces 450, the one or more communications interface(s) 460, or a combination thereof. The particular example of FIG. 4 also depicts that the system memory 430 (e.g., one or more memory devices) stores program data 436. Program data 436 may include any data necessary for operation of the one or more application 434.

In some implementations, the program data 436 may include data for a digital representation of guidance lines, a geo-spatial image of an airport, or buffers that define a polygon representation of taxiways at an airport.

In some implementations, the one or more storage devices 442 include nonvolatile storage devices, such as magnetic disks, optical disks, or flash memory devices. In some examples, the one or more storage devices 442 include removable memory devices, non-removable memory devices or both. In some cases, the one or more storage devices 442 are configured to store an operating system, images of operating systems, applications, and program data. In a particular example, the system memory 430, the one or more storage devices 442, or both, include tangible computer-readable media. As used herein, a storage device (e.g., non-transitory computer-readable media such as the storage device 442) is a hardware device, and is not merely a signal.

In the example of FIG. 4, the one or more processors 420 are configured to communicate with the one or more input/output interfaces 450 to enable the computing device 410 to communicate with one or more input/output devices 470 to facilitate user interaction. In some implementations, the one or more input/output interfaces 450 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 470 include keyboards, pointing devices, displays, speakers, microphones, touch screens, one or more other devices, or a combination thereof. In some examples, the one or more processors 420 are configured to detect interaction events based on user input received via the one or more input/output interfaces 450.

In a particular example, the one or more processors 420 are configured to communicate with (or send signals to) one or more devices 480 using the one or more communications interface(s) 460. In some implementations, the communications interface(s) 460 include one or more wired interfaces (e.g., Ethernet interfaces), one or more wireless interfaces that comply with an IEEE 802.11 communication protocol, one or more other wireless interfaces, one or more optical interfaces, one or more other network interfaces, or a combination thereof. In some examples, the one or more devices 480 include host computers, servers, workstations, line replaceable units of an aircraft, one or more other computing devices, or a combination thereof.

Although one or more of FIGS. 1-4 illustrate systems, apparatuses, and/or methods according to the teachings of the disclosure, the disclosure is not limited to these illustrated systems, apparatuses, and/or methods. One or more functions or components of any of FIGS. 1-4 as illustrated or described herein may be combined with one or more other portions of another of FIGS. 1-4. For example, one or more elements of the method 300 of FIG. 3 may be performed in combination with other operations described herein. Accordingly, no single implementation described herein should be construed as limiting and implementations of the disclosure may be suitably combined without departing from the teachings of the disclosure. As an example, one or more operations described with reference to FIGS. 1-4 may be optional, may be performed at least partially concurrently, and/or may be performed in a different order than shown or described.

Aspects of the disclosure are described further with reference to the following set of interrelated Examples:

Example 1 includes a method comprising obtaining medial axes of buffers around guidance lines of taxiways of an airport, wherein the buffers define a taxiway polygon representation of the taxiways, identifying a plurality of intersection points of the medial axes; segmenting the taxiway polygon into taxiway segments with segment lines based on the plurality of intersection points, wherein a particular segment line associated with an intersection point is offset a distance from the intersection point and is at a particular angle relative to a medial axis extending from the intersection point; and generating a map of the airport, the map including the taxiway segments.

Example 2 includes the method of Example 1, further comprising analyzing a geo-spatial image of an airport to determine the guidance lines of taxiways of the airport; determining the buffers around the guidance lines of the taxiways; and determining the medial axes of the buffers.

Example 3 includes the method of Example 2, wherein the buffers are based on features depicted in the geo-spatial image, based on a particular offset distances from the guidance lines, or both.

Example 4 includes the method of any of Example 2 or Example 3, wherein the map overlays the geo-spatial image.

Example 5 includes the method of any of Example 1 to Example 4, wherein the guidance lines and the medial axes are distinct.

Example 6 includes the method of any of Example 1 to Example 5, further comprising applying a filter to the buffers before determining the medial axes.

Example 7 includes the method of any of Example 1 to Example 6, wherein segmenting the taxiway polygon comprises identifying a first potential segment line associated with a first intersection point and a second potential segment line associated with a second intersection point, and wherein the taxiway polygon is segmented by the first potential segment line and the second potential segment line responsive to the first potential segment line not being within a threshold distance of the second potential segment line along the medial axes.

Example 8 includes the method of Example 7, further comprising identifying a composite segment line between the first potential segment line and the second potential segment line responsive to the first potential segment line being within the threshold distance of the second potential segment line along the medial axes, and wherein the taxiway polygon is segmented by the composite segment line.

Example 9 includes the method of any of Example 1 to Example 8, wherein the taxiway segments includes a particular polygon that does not include any of the plurality of intersection points.

Example 10 includes the method of any of Example 1 to Example 9, wherein a particular intersection point of the plurality of intersection points is identified responsive to three or more line segments directly coupling to the particular intersection point.

Example 11 includes the method of any of Example 1 to Example 10, wherein the particular angle is 90 degrees relative to the medial axis.

According to Example 12, a device includes: a memory configured to store instructions; and a processor configured to execute the instructions to perform the method of any of Example 1 to Example 11.

According to Example 13, a non-transitory computer-readable medium stores instructions that, when executed by a processor, cause the processor to perform the method of any of Example 1 to Example 11.

According to Example 14, an apparatus includes means for carrying out the method of any of Example 1 to Example 11.

According to Example 15, a device comprising: a memory configured to store a digital representation of guidance lines of taxiways of an airport; a processor configured to: obtain medial axes of buffers around guidance lines of taxiways of an airport, wherein the buffers define a taxiway polygon representation of the taxiways; identify a plurality of intersection points of the medial axes; segment the taxiway polygon into taxiway segments with segment lines based on the plurality of intersection points, wherein a particular segment line associated with an intersection point is offset a distance from the intersection point and is at a particular angle relative to a medial axis extending from the intersection point; and generate a map of the airport, the map including the taxiway segments.

Example 16 includes the device of Example 15, wherein segmenting the taxiway polygon comprises identifying a first potential segment line associated with a first intersection point and a second potential segment line associated with a second intersection point, and wherein the taxiway polygon is segmented by the first potential segment line and the second potential segment line responsive to the first potential segment line not being within a threshold distance of the second potential segment line along the medial axes.

Example 17 includes the device of Example 16, wherein the processor is further configured to identify a composite segment line between the first potential segment line and the second potential segment line responsive to the first potential segment line being within the threshold distance of the second potential segment line along the medial axes, and wherein the taxiway polygon is segmented by the composite segment line.

Example 18 includes the device of any of Examples 15 to Example 17, wherein the processor is further configured to analyze a geo-spatial image of an airport to determine the guidance lines of taxiways of the airport.

Example 19 includes the device of Example 18, wherein the buffers are based on features depicted in the geo-spatial image, based on a particular offset distances from the guidance lines, or both.

Example 20 includes the device of Examples 18 or Example 19, wherein the map overlays the geo-spatial image.

According to Example 21, a computer-readable storage device storing instructions that, when executed by one or more processors, cause the one or more processors to: obtain medial axes of buffers around guidance lines of taxiways of an airport, wherein the buffers define a taxiway polygon representation of the taxiways; identify a plurality of intersection points of the medial axes; segment the taxiway polygon into taxiway segments with segment lines based on the plurality of intersection points, wherein a particular segment line associated with an intersection point is offset a distance from the intersection point and is at a particular angle relative to a medial axis extending from the intersection point; and generate a map of the airport, the map including the taxiway segments.

Example 22 includes the computer-readable storage device of Example 21, wherein the instructions further cause the one or more processor to analyze a geo-spatial image of an airport to determine the guidance lines of taxiways of the airport.

Example 23 includes the computer-readable storage device of Example 22, wherein the buffers are based on features depicted in the geo-spatial image, based on a particular offset distances from the guidance lines, or both.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:

generating buffers from guidance lines of taxiways of an airport, wherein the buffers define a taxiway shape representation of the taxiways;

applying a filter to the buffers to generate filtered buffers;

obtaining medial axes of the filtered buffers generated from the guidance lines;

identifying a plurality of intersection points of the medial axes;

segmenting the taxiway shape representation into taxiway segments with segment lines based on the plurality of intersection points of the medial axes, wherein a particular segment line associated with an intersection point is offset a distance from the intersection point and is at a particular angle relative to a medial axis extending from the intersection point; and generating a map of the airport, the map including the taxiway segments.

2. The method of claim 1, further comprising:

analyzing a geo-spatial image of the airport to determine the guidance lines of taxiways of the airport;

determining the buffers around the guidance lines of the taxiways; and determining the medial axes of the buffers.

3. The method of claim 2, wherein the buffers are based on features depicted in the geo-spatial image, based on a particular offset distance from the guidance lines, or both.

4. The method of claim 2, wherein the map overlays the geo-spatial image.

5. The method of claim 1, wherein the guidance lines and the medial axes are distinct.

6. The method of claim 1, wherein the guidance lines comprise center lines of the taxiways.

7. The method of claim 1, wherein segmenting the taxiway shape representation comprises identifying a first potential segment line associated with a first intersection point and a second potential segment line associated with a second intersection point, and wherein the taxiway shape representation is segmented by the first potential segment line and the second potential segment line responsive to the first potential segment line not being within a threshold distance of the second potential segment line along the medial axes.

8. The method of claim 7, further comprising identifying a composite segment line between the first potential segment line and the second potential segment line responsive to the first potential segment line being within the threshold distance of the second potential segment line along the medial axes, and wherein the taxiway segments are segmented by the composite segment line.

9. The method of claim 1, wherein the taxiway segments include a particular shape that does not include any of the plurality of intersection points.

10. The method of claim 1, wherein a particular intersection point of the plurality of intersection points is identified responsive to three or more line segments directly coupling to the particular intersection point.

11. The method of claim 1, wherein the particular angle is 90 degrees relative to the medial axis.

12. A device comprising:

a memory configured to store a digital representation of guidance lines of taxiways of an airport;

a processor configured to:

generate buffers from guidance lines of taxiways of the airport, wherein the buffers define a taxiway shape representation of the taxiways;

apply a filter to the buffers to generate filtered buffers;

obtain medial axes of the filtered buffers generated from the guidance lines;

identify a plurality of intersection points of the medial axes;

segment the taxiway shape representation into taxiway segments with segment lines based on the plurality of intersection points of the medial axes, wherein a particular segment line associated with an intersection point is offset a distance from the intersection point and is at a particular angle relative to a medial axis extending from the intersection point; and generate a map of the airport, the map including the taxiway segments.

13. The device of claim 12, wherein segmenting the taxiway shape representation comprises identifying a first potential segment line associated with a first intersection point and a second potential segment line associated with a second intersection point, and wherein the taxiway shape representation is segmented by the first potential segment line and the second potential segment line responsive to the first potential segment line not being within a threshold distance of the second potential segment line along the medial axes.

14. The device of claim 13, wherein the processor is further configured to identify a composite segment line between the first potential segment line and the second potential segment line responsive to the first potential segment line being within the threshold distance of the second potential segment line along the medial axes, and wherein the taxiway segments are segmented by the composite segment line.

15. The device of claim 12, wherein the processor is further configured to analyze a geo-spatial image of the airport to determine the guidance lines of taxiways of the airport.

16. The device of claim 15, wherein the buffers are based on features depicted in the geo-spatial image, based on a particular offset distance from the guidance lines, or both.

17. The device of claim 15, wherein the map overlays the geo-spatial image.

18. A computer-readable storage device storing instructions that, when executed by one or more processors, cause the one or more processors to:

generate buffers from guidance lines of taxiways of an airport, wherein the buffers define a taxiway shape representation of the taxiways;

apply a filter to the buffers to generate filtered buffers;

obtain medial axes of the filtered buffers generated from the guidance lines;

identify a plurality of intersection points of the medial axes;

segment the taxiway shape representation into taxiway segments with segment lines based on the plurality of intersection points of the medial axes, wherein a particular segment line associated with an intersection point is offset a distance from the intersection point and is at a particular angle relative to a medial axis extending from the intersection point; and generate a map of the airport, the map including the taxiway segments.

19. The computer-readable storage device of claim 18, wherein the instructions further cause the one or more processors to analyze a geo-spatial image of the airport to determine the guidance lines of taxiways of the airport.

20. The computer-readable storage device of claim 19, wherein the buffers are based on features depicted in the geo-spatial image, based on a particular offset distance from the guidance lines, or both.

21. A method comprising:

processing a digital representation of an airport to generate buffers from guidance lines of taxiways of the airport, wherein the buffers define a taxiway shape representation of the taxiways, and wherein the digital representation of the airport comprises one or more of a satellite image of the airport and an engineering drawing of the airport;

applying a filter to the buffers to generate filtered buffers;

obtaining medial axes of the filtered buffers generated from the guidance lines;

identifying a plurality of intersection points of the medial axes;

segmenting the taxiway shape representation into taxiway segments with segment lines based on the plurality of intersection points of the medial axes, wherein a particular segment line associated with an intersection point is offset a distance from the intersection point and is at a particular angle relative to a medial axis extending from the intersection point; and generating a map of the airport, the map including the taxiway segments.

* * * * *